Patented Apr. 26, 1938

2,115,505

UNITED STATES PATENT OFFICE 2,115,505

PROCESS OF PREPARING SOFT CURD MILK

Victor Conquest, Chicago, Ill., assignor to Armour and Company, Chicago, Ill., a corporation of Illinois No Drawing. Application April 1, 1937,
Serial No. 134,459

4 Claims. (Cl. 99—60)

This invention relates to processes of preparing a soft-curd milk, and it comprises processes wherein whole cow's milk is admixed with a very small amount of pancreatic enzymes, the mixture maintained at certain temperatures and for certain specific times, as more fully hereinafter described, to reduce the curd tension of the milk to a value of not more than about 25 grams, and the milk then pasteurized.

Ordinary whole cow's milk tends to coagulate in the human stomach to form relatively hard curds of casein. Many people cannot digest such milk without experiencing some discomfort, and processes by which the milk could be so modified that the curd formed is much softer have been desired. Ways of measuring the character of the curd are available, such, for example, as the Hill curdometer. In broad aspects, the curdometer simply consists of a plurality of knife edges, radiating spoke-wise from the center support to the rim, which can be caused to move through a body of coagulated milk. The amount of force necessary to push the knife-edges through the coagulated milk, and thus cut the curd, is a measure of the curd hardness or "tension". The tension is expressed in grams. For example, an ordinary whole raw cow's milk has a curd tension of from 40 to about 95 grams.

The curd tension appears to be related in part to the calcium in the milk. When the calcium is removed the curd tension decreases markedly, and methods of softening the curd by passing the whole milk through zeolites to remove the calcium have been patented. This method, however, has disadvantages because important mineral constituents, chiefly calcium and phosphorus to the extent of about 20%, is necessarily removed. It is a well-known fact that the calcium in milk is an essential food constituent, especially for the development of firm, strong teeth in infants. Others have attempted to modify the curd tension by subjecting the milk to mechanical forces such as agitation or homogenization, but these methods have not come into extensive commercial use as they are not sufficiently softening on the curd.

I have found that in zeolite-treated milk calcium ions reunite with the casein to again give a hard curd. This is not true of the milk of my invention.

What the art desires is some way of modifying the milk so that the character of the casein curds formed during coagulation is such that the curd tension thereof is not more than 25 grams, and even less than 10 grams for those who have great difficulty in digesting ordinary milk. At the same time, however, nothing should be taken away from the milk. Its normal mineral content should remain unchanged, the character of the casein should remain substantially unchanged, and there should be no actual substantial pre-digestion of any milk proteins or albumins. What is desired is a way to so modify the milk that when it contacts with the hydrochloric acid coagulating agent of the stomach the casein curds are softer and more digestible, but in all other respects the milk should be substantially unchanged.

I have now discovered ways by which this desired result can be obtained. My invention is based upon the discovery that the mixed enzymes, obtained from the pancreas, can be made to modify whole milk so that, on coagulation, the curd tension is greatly reduced. The conditions of my process are such that any substantial digestion of the casein to form liquid proteins, or casein digestion products, is avoided. I visualize the action of pancreatic enzymes in my process as effecting a loosening-up or weakening of the calcium-casein bond so that the treated milk no longer coagulates with the formation of curds of high tension. The treatment with the pancreatic enzymes is so "light" in character that the casein is not digested to any substantial extent and no other substantial changes occur in the treated milk.

In the practise of my invention I add to cow's milk about one pound of mixed pancreatic enzymes, or pancreas solution, for each 5,000 to 40,000 pounds of milk depending upon its original curd tension and the activity of the enzymes. This is a very small amount of pancreatic enzymes in comparison with the volume of milk treated and is in conformity with the principles of my invention, namely that the enzymes shall only be used to an extent sufficient to effect a change in curd characteristics and nothing more. I then maintain the mixture of milk and pancreatic enzymes for a length of time depending upon the temperature of the mixture. At a temperature of 40° to 50° F. the mixture should be maintained in a vessel for about twenty-four hours and then subjected to batch or flash pasteurization as is usually practised in the milk industry. The pasteurizing temperature immediately stops the action of the enzymes and at the same time pasteurizes the milk.

Or I can warm the mixture of milk and enzymes to speed up the enzyme action. Thus, for example, I warm the cow's milk to a temperature of about 90° to 105° F., add, with agitation, one part of pancreatic enzymes for each 10,000 pounds of milk, hold the mixture at the stated temperature for about fifteen minutes, and then increase the temperature to about 145° F. to stop the action of the pancreatin and other enzymes present and to pasteurize the milk.

Or I can add the proper amount of pancreatin to the pasteurizing vat and immediately start to raise the temperature as in pasteurizing, the reaction taking place during the time the milk is being raised to the pasteurizing temperature.

The effect of temperature on the activity of the enzyme is enormous as will be observed from the data just given. At 95° F. to 105° F. the enzyme is so active that it should not be allowed to act upon the milk for longer than about fifteen minutes. At 50° F. its rate of reaction is greatly lessened. The duration of enzyme action at any temperature within these limits can be determined by admixing pancreatin with small batches of milk in about the proportions stated, allowing the pancreatin to act for varying periods of time, and then determining the curd tension by a Hill curdometer. That time for the specific temperature should be chosen which develops a curd tension of not more than about 25 grams Hill. The amount of casein hydrolyzed or solubilized, however, should be substantially unchanged from that which would be obtained from untreated cow's milk from the same source. This is to avoid any substantial pre-digestion of the casein. If there is substantial pre-digestion to give liquid proteins not coagulated by rennin or hydrochloric acid, the fundamental objects of my invention are not realized. As stated, my treatment of the milk with pancreatin is so light that the only effect is to modify the curd tension. I do not intend to change other characteristics of the milk.

Although I ordinarily practise my process by adding the pancreatin to large volumes of milk and pasteurizing before bottling, I can modify my process so that the pancreatin action and pasteurization can occur after bottling. Since much milk is pasteurized in bottles the modification is of practical importance.

For example, I add about one pound of pancreatin to 5,000–40,000 pounds of milk in a large vat, stirring the mixture to get uniform incorporation of the enzyme. This mixture, at a temperature, for instance, of 40° F. is then bottled and pasteurized in the usual way. Enzyme action occurs while the milk is being raised slowly to the pasteurizing temperature. When the temperature gets to about 95° F. I hold it for about fifteen minutes and then raise to 145° F. In still another modification I can let the pancreatin act while the milk is in bulk, then bottle and pasteurize while bottled.

I am aware that others have subjected milk to the action of enzymes. For example, Lahrman U. S. Patent 268,245 describes a process for making an artificial human milk from cow's milk. In this process very nearly all of the casein is hydrolyzed or liquified. The milk is fortified with such amounts of cream and sugar as will bring these constituents into correspondence with those of an average sample of human milk, and there is a step wherein a pancreas solution or pepsin is added to the fortified milk and allowed to act for sixty to seventy minutes at moderately elevated temperatures. In this instance the pancreatin acts to digest the albuminoids and proteins. This directly follows from the statements in the patent and from the fact that pancreatin working over relatively long periods of time will digest much of the proteins. My invention differs from this patent in that I avoid any substantial digestion and I do not, of course, add anything other than the pancreatin to the milk. My invention is based upon the discovery that pancreatin if allowed to act for a restricted length of time depending upon the temperature can be made to soften the curd without substantial digestion and the consequent development of bitter flavor due to proteose and peptone formation from casein splitting.

I am also aware that Backhaus U. S. Patent 597,378 describes the addition of rennin and other ferments to hydrolyze the albumins in skim milk and thus render them soluble. And I am aware that Dungern U. S. Patent 700,631 describes various ways of pre-treating cow's milk, among which he mentions as prior art the addition of pancreatin to the milk to render the casein digestible. He notes that the "artificial digestion" requires conditions which render its general application out of the question. The conditions are not stated in the patent but I believe that they refer to those described by Lahrman, namely, action of the pancreatin at relatively high temperatures for relatively longer periods of time than I employ so that much of the casein is solubilized.

I have referred to the above prior art so that the differences between my invention and those of the prior art will be clearly appreciated. I make no claim to the treatment of milk with pancreatin under conditions which will effect any substantial hydrolysis or digestion of the casein or albuminoids. To put it another way, my process is much less drastic than those hitherto used, and it is based upon the discovery that pancreatin and pancreatic enzymes, when used under the specific conditions stated above, can be made to merely soften the curd of the milk without digestion thereof. As noted above, prior art processes using pancreas solution carry the hydrolysis to the stage of proteose and peptone formation with consequent development of bitter flavor.

My process is of economical significance in the art since the treated milk has undergone no changes in mineral values, the method is a simple one requiring no apparatus other than that customarily found in a dairy, and the pancreatin will act at the normal hydrogen ion concentration of the milk, about a pH of 7. Other ferments, such as rennin, require a lower pH if they are to be effective and the addition of acids to the milk for this purpose is a very real disadvantage.

Milk treated and pasteurized in accordance with my process can be concentrated to give a milk powder or a concentrated fluid milk in any of the well-known ways.

Having thus described my invention, what I claim is:

1. The process of preparing a soft-curd milk having a curd tension not exceeding about 35 grams measured by a Hill curdometer which consists in adding to the whole milk a small amount of pancreatic enzymes of the order of one pound of enzymes to about 5,000 to 40,000 pounds of milk, depending on the initial curd hardness in the raw milk and the activity of the enzyme, allowing the enzymes to act at a temperature of between about 40° F. and 105° F. for a period of about twenty-four hours to fifteen minutes, the length of time depending upon the temperature of treatment so that at a temperature of about 40° F. the enzymes act for about twenty-four hours and at 105° F. for about fifteen minutes, and then, after reducing the curd tension, in the manner specified, to a value not exceeding about 25 grams, heating the milk mixture to a pasteurizing temperature before any substantial hydrolysis or digestion of the casein occurs.

2. The process of preparing a soft-curd milk having a curd tension not exceeding about 25 grams measured by a Hill curdometer which consists in adding to the whole milk a small amount of pancreatin of the order of one pound of pancreatin to about 5,000 to 40,000 pounds of milk, maintaining the mixture at a temperature of about 105° F. for about fifteen minutes, and then pasteurizing the milk before any substantial hydrolysis or digestion of the casein occurs.

3. The process of preparing a soft-curd milk having a curd tension not exceeding about 25 grams measured by a Hill curdometer which consists in adding to the whole milk a small amount of pancreatin of the order of one pound of pancreatin to about 5,000 to 40,000 pounds of milk, maintaining the mixture at a temperature of about 50° F. for about twenty-four hours, and then pasteurizing the milk before any substantial hydrolysis or digestion of the casein occurs.

4. The process of preparing a soft-curd milk having a curd tension not exceeding about 25 grams measured by a Hill curdometer which consists in adding to the whole milk a small amount of pancreatin of the order of one pound of pancreatin to about 5,000 to 40,000 pounds of milk, bottling the mixture, allowing the pancreatin to act at a temperature between about 50° F. and 105° F. until the curd tension has been reduced to a value not exceeding about 25 grams, and then pasteurizing the milk, while bottled, before any substantial hydrolysis or digestion of the casein occurs.

VICTOR CONQUEST.